US012395003B2

(12) United States Patent
Hawkins et al.

(10) Patent No.: US 12,395,003 B2
(45) Date of Patent: Aug. 19, 2025

(54) CHARGING OF AN ENERGY STORAGE SYSTEM OF A WIND TURBINE

(71) Applicant: Siemens Gamesa Renewable Energy A/S, Brande (DK)

(72) Inventors: Samuel Hawkins, Vejle (DK); Gustav Hoegh, Vejle (DK); Dennis Stachniuk Jensen, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/726,162

(22) PCT Filed: Jan. 5, 2023

(86) PCT No.: PCT/EP2023/050148
§ 371 (c)(1),
(2) Date: Jul. 2, 2024

(87) PCT Pub. No.: WO2023/131635
PCT Pub. Date: Jul. 13, 2023

(65) Prior Publication Data
US 2025/0158443 A1 May 15, 2025

(30) Foreign Application Priority Data
Jan. 7, 2022 (EP) .................................... 22150501

(51) Int. Cl.
*H02J 7/14* (2006.01)
*F03D 9/11* (2016.01)
(Continued)

(52) U.S. Cl.
CPC ............. *H02J 7/1415* (2013.01); *F03D 9/11* (2016.05); *F03D 9/25* (2016.05); *H02K 7/183* (2013.01)

(58) Field of Classification Search
CPC ........... H02J 7/1415; F03D 9/11; H02K 7/183
(Continued)

(56) References Cited

U.S. PATENT DOCUMENTS

2011/0077786 A1 3/2011 Vaidyanathan
2011/0308574 A1 12/2011 Vaidyanathan
(Continued)

OTHER PUBLICATIONS

PCT International Search Report and Written Opinion of International Searching Authority mailed Mar. 31, 2023 corresponding to PCT International Application No. PCT/EP2023/050148 filed Jan. 5, 2023.

*Primary Examiner* — Charles Reid, Jr.
(74) *Attorney, Agent, or Firm* — Schmeiser, Olsen & Watts, LLP

(57) ABSTRACT

A method of charging an energy storage system of a wind turbine is provided. The wind turbine includes a power generation system and a power delivery interface. The method includes obtaining a maximum power limit to which electrical power supplied to the external system via the power delivery interface is limited; monitoring an amount of electrical power provided from the power generation system to the power delivery interface or an amount of power generatable by the power generation system; and determining if a predefined condition is met. If the predefined condition is met, the wind turbine is operated in a charging mode in which electrical power generated in addition to a first amount of electrical power is supplied from the power generation system to the energy storage system to charge the energy storage system. The first amount corresponds to a power rating of the wind turbine.

15 Claims, 6 Drawing Sheets

(51) Int. Cl.
 F03D 9/25 (2016.01)
 H02K 7/18 (2006.01)
(58) Field of Classification Search
 USPC .................................................... 290/44, 55
 See application file for complete search history.

(56) References Cited

U.S. PATENT DOCUMENTS

2019/0074709 A1    3/2019  Homma et al.
2020/0328705 A1*  10/2020  Ganireddy ............... H02J 1/12

* cited by examiner

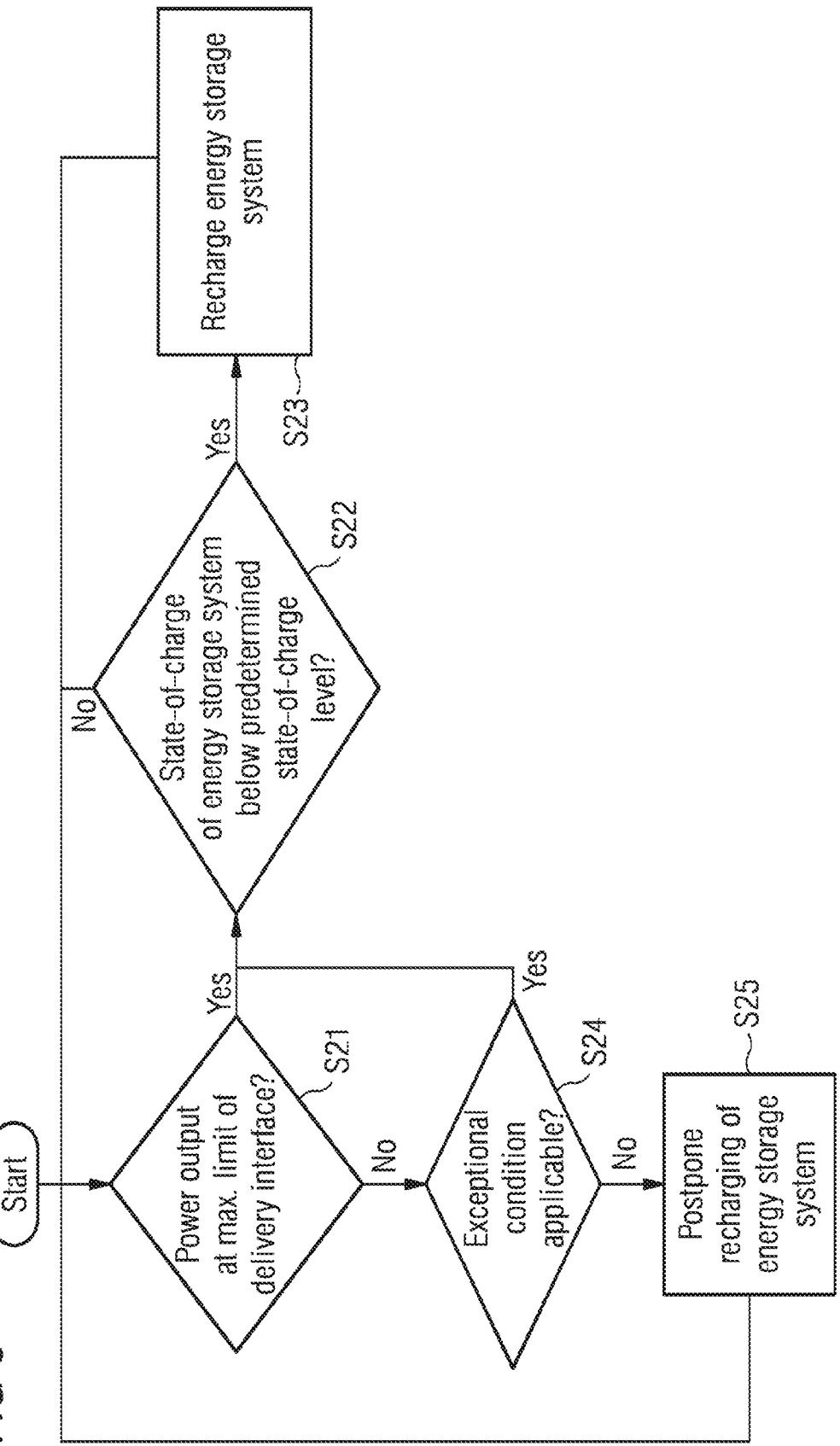

CHARGING OF AN ENERGY STORAGE SYSTEM OF A WIND TURBINE

CROSS-REFERENCE TO RELATED APPLICATIONS

This application is a national stage of PCT Application No. PCT/EP2023/050148, having a filing date of Jan. 5, 2023, claiming priority to EP Application Serial No. 22150501.9, having a filing date of Jan. 7, 2022, the entire both contents of which are hereby incorporated by reference.

FIELD OF TECHNOLOGY

The following invention relates to a method of charging an energy storage system of a wind turbine, to a respective control system performing such method and to a computer program comprising control instructions for carrying out such method.

BACKGROUND

A wind turbine generally converts wind energy into rotational mechanical energy using a wind turbine rotor comprising aerodynamic rotor blades and a rotating shaft, wherein the rotational mechanical energy is converted into electrical energy by a generator. The electrical power is then conditioned using a power conditioning system, which may comprise high power frequency converters. The generated electrical power may then be fed into an electrical power grid or provided to an electrical consumer.

It is conventional to provide electrical storage systems in wind turbines. For example, such storage systems may be provided in form of an UPS (uninterruptable power supply) that may keep certain wind turbine components operational in case of a wind turbine shutdown and/or power outage. Furthermore, it has been proposed to store electrical energy generated by wind turbines in large energy storage systems that may for example be central to a wind farm. Such systems may for example be used to store excess energy and deliver energy to the power grid in case of high-power demand, thereby effectively providing a buffer of electrical power for the power grid that stabilizes the grid.

Charging of these energy storage systems generally occurs by redirecting electrical power produced by the wind turbine to the respective storage device, or by extracting power from the external power grid. It is desirable to make a respective system more energy-efficient and in particular to increase the amount of electrical energy that can be delivered to the power grid. For example, by extracting power from the power grid to charge the storage device, the net amount of electrical power delivered to the grid is effectively reduced. Further, if the power is later returned by discharging the energy storage system, energy conversion and ohmic losses result in a net deficit. It is thus desirable to charge an energy storage system such that the loss in energy that is ultimately delivered by a wind turbine to a load or consumer is reduced.

The document US2011/0077786 A1 describes a net metering apparatus for a power generation system, wherein during periods in which the power generated by the power generation system exceeds a desired or legal power limit, excess energy is directed to the storage system by the net metering apparatus.

The document US2019/0074709 A1 describes a renewable energy power supply that generates electrical power and a power control apparatus that stores an amount of power exceeding an output upper limit instruction received from an electricity company in an energy storage apparatus.

SUMMARY

Accordingly, there is a need to mitigate at least some of the drawbacks mentioned above and to increase the amount of electrical energy that can be delivered by a wind turbine with associated energy storage system to an external system, e.g., a load.

An aspect relates to a method of charging an energy storage system of a wind turbine. The wind turbine comprises a power generation system for generating electrical power and a power delivery interface for delivering the generated electrical power to an external system that is external to the wind turbine. In embodiments, the method comprises obtaining a maximum power limit to which electrical power supplied to the external system via the power delivery interface is limited; monitoring at least one of an amount of electrical power provided from the power generation system to the power delivery interface or an amount of power generatable by the power generation system; determining if a predefined condition is met, wherein determining that the predefined condition is met requires at least determining, based on the monitoring, that the amount of power generatable by the power generation system (at the prevailing environmental conditions) is larger than a first amount of electrical power required to deliver via the power delivery interface electrical power at the maximum power limit; and, if the predefined condition is met, operating a power system of the wind turbine in a charging mode in which electrical power generated by the power generation system in addition to the first amount of electrical power is supplied from the power generation system to the energy storage system to charge the energy storage system.

By such system, the free electrical power that may be generated by the power generation system in excess of the maximum electrical power supplied to the delivery interface may thus be used for charging the energy storage system. Charging the energy storage system may thereby not have a negative effect on the amount of power that is delivered by the wind turbine to the external system, which may be for example a collector grid, a power grid, another type of load, or the like. A relatively small margin above the first amount of electrical power may be sufficient and may be used for charging the energy storage system. As soon as more than the first amount is generated, the charging may for example commence. When the first condition is not met, the power system may be operated in an idle mode in which the energy storage system is an idle state, or in a discharge mode in which energy is discharged from the energy storage system (for example in cases in which additional power may be supplied to the external system or not sufficient power may be available to operate wind turbine auxiliary systems). The energy storage system may accordingly not be charged if the power generation is below the first amount; by avoiding such charging, loss in electrical power provided to the power delivery interface may be avoided.

In some embodiments, the wind turbine may be configured to output a maximum amount of power via the power delivery interface that corresponds to a power rating of the wind turbine. Such maximum amount of power, i.e., the output power rating of the wind turbine, may be determined by the physical configuration of the wind turbine, e.g., by the maximum rated electrical output capability of the wind turbine (it may also be termed maximum rated output power). The power generation system may be configured to generate at least a first amount of electrical power that corresponds to the power rating of the wind turbine at the power delivery interface and a second amount of electrical power in excess of the first amount. The power generation system may thus have an overhead capacity that allows it to generate the second amount of power in addition to the first amount of power. In some embodiments, the maximum power limit at the power delivery interface may correspond to the power rating of the wind turbine. Accordingly, the charging mode may only be entered if the power generated by the power generation system exceeds the first amount of power required to provide an output power at the power delivery interface that corresponds to the nominal power rating of the wind turbine. Thus, charging may occur while the wind turbine still delivers power at its nominal power rating. Loss of output power due to charging may thus be prevented.

Determining that the predefined condition is met may comprise determining that one or more additional requirements are met in addition to the above-mentioned first requirement. For example, an additional requirement may be that the energy storage system is not above a predetermined charging state (e.g., is not fully charged), and/or that the amount of electrical power generated in addition to the first amount is sufficiently high to commence charging (e.g., above a minimum threshold); and/or that more than the first amount is generated over a predetermined amount of time (e.g., to avoid frequent changes of the operating mode); or the like.

The monitoring may for example occur by receiving respective information from a controller, e.g., a wind turbine controller, or from a measuring unit provided in the wind turbine, or the like. The power system of the wind turbine may comprise the power generating system, the energy storage system, and/or the power delivery interface; it may comprise further components, such as switches and/or converters to control the power flow from the power generation system to the storage system. Operating the power system in the charging mode may for example occur by controlling a power converter of the energy storage system to charge the energy storage system, or by controlling other components of the power system to divert electrical power to the energy storage system for charging.

In an example, determining that the amount of power generatable by the power generation system is larger than the first amount comprises determining that the amount of electrical power delivered to the power delivery interface (abbreviated as 'delivery interface') is at or close to the maximum power limit. As an example, it may be determined that the power output via the delivery interface increases and reaches the maximum power limit, upon which it may be determined that the amount of power that can be generated by the power generation system is larger than the first amount so that operation can transition into the charging mode and additional electrical power can be generated for charging the energy storage device without negatively impacting the power output via the delivery interface. It may additionally or alternatively be determined that a respective amount of power is generatable by determining that the power generation system generates a respective amount of power.

For example, the determining that the amount of power generatable by the power generation system is larger than the first amount (in particular comprises at least the first amount and the second amount) may employ (or may be based on) the monitored amount of electrical power provided to the power delivery interface (for example to estimate if the generatable amount of power is larger than the first amount) and/or may employ (directly) the monitored amount of power generatable by the power generation system. Based on monitoring either or both of these parameters, it may be determined if the amount of power generatable by the power generation system is larger than the first amount, in particular corresponds to at least the first amount and a second amount in excess of the first amount. For example, it may be estimated that the generatable amount of power is larger than the first amount if it is detected that the amount of electrical power provided to the power delivery interface first increases and then reaches the maximum power limit.

Operating in the charging mode may further comprise supplying, from the power generation system, electrical power at or close to the maximum power limit to the power delivery interface. In some situations, fluctuations of the power output may occur, e.g., less than 10%, 5%, 2% or 1% of the output power, and such fluctuations may be comprised in operating at or close to the maximum power limit.

In the charging mode, the power generation system may generate the first amount of electrical power that is supplied to the power delivery interface and that corresponds to a rated power output of the wind turbine at the power delivery interface, and the power generation system may further generate additional electrical power in excess of the first amount which is supplied to the energy storage system for charging the energy storage system.

In an example, determining that the predefined condition is met further comprises determining that the amount of power generatable by the power generation system comprises at least the first amount and a second amount of electrical power (i.e., in addition). In the charging mode, an amount of electrical power equal or less than the second amount may be supplied from the power generation system to the energy storage system to charge the energy storage system. The second amount may for example correspond to a margin above the first amount (in particular to a free energy margin); charging may occur from this margin, and thus without affecting the power output via the delivery interface.

For example, the second amount of power may correspond at least to a predetermined safety power margin plus a spare power margin. In the charging mode, an amount of electrical power equal or less than the spare power margin may be supplied from the power generation system to the energy storage system to charge the energy storage system. In the example, the generatable amount of electrical power may thus be larger than the first amount plus the safety margin in order for the requirement to be met. Electrical power that may be generated above this sum may then be supplied for charging the energy storage system.

The safety margin may for example correspond to an amount of electrical power required to operate at least one auxiliary power consumer of the wind turbine, in particular an auxiliary drive of the wind turbine and/or a cooling system of the wind turbine. System availability and security may thereby be improved, since on short notice, additional power may be supplied to such auxiliary system. The at least one auxiliary power consumer may for example be at least one of an auxiliary drive, yaw drive, pitch drive, a cooling system, or a service lift of the wind turbine.

In an example, the second amount of power may correspond at least to or is a sum of the safety power margin, the spare power margin and an auxiliary power consumption, wherein the auxiliary power consumption may correspond to an amount of electrical power that is being consumed by one or more auxiliary systems of the wind turbine different from the energy storage system. The energy storage system may in that sense not be considered to form part of the auxiliary system of the wind turbine. When an auxiliary system is being operated, the condition may thus only be met and charging may only occur if the amount of generatable electrical power is larger than the first amount, the safety power margin and the auxiliary power consumption. Consequently, even if auxiliary power consumption occurs, the amount of electrical power delivered via the power delivery interface may not be reduced. For example, in the method, a current or upcoming auxiliary power consumption may be determined, and the amount of power provided for charging the energy storage system may be adjusted accordingly. A maximum amount of electrical power generatable by the power generating system may be limited by one or more electrical components of the power generation system. The maximum generatable amount of electrical power may be higher than the first amount. In other words, it may be higher than the amount required to provide power at the maximum power limit at the delivery interface. In some examples, the maximum generatable amount of electrical power of the power generating system may be higher than a power rating of the wind turbine at the power delivery interface.

For example, power supply of auxiliary power consumers of the wind turbine generally occurs by diverting electrical power that is generated by the power generation system. The power generation system may be designed to provide the power at the power delivery interface at the rated output power, and may further be configured to provide additional power for operating auxiliary consumers when the wind turbine is giving out rated power via the power delivery interface (i.e., the rating of the components of the power generation system, e.g., the electrical drivetrain components, may have a higher power rating than the nominal output power rating of the wind turbine. Accordingly, the respective overhead capacity in the electrical power generation system may be used for re-charging the energy storage system when the available overhead capacity is not required for driving the auxiliary consumers. The first amount plus the second amount of electrical power may in particular at most correspond to the maximum generatable amount of electrical power, in particular to the maximum power rating of the components of the power generation system.

The skilled person may recognize that the actual amount of electrical power generatable by the power generation system may be less than the maximum amount, and may in particular depend on environmental conditions, such as wind conditions, in particular wind speed. Unless other conditions prevent operation in the charging mode (e.g., energy storage system already fully charged), the power generation system may be controlled so as to generate the maximum possible electrical power (as determined by the environmental conditions and the maximum generatable amount as limited by the rating of the components) and use the surplus energy above the first amount plus the auxiliary consumption plus the safety margin in order to charge the energy storage system.

Operating the power system in the charging mode may comprise controlling a charging amount of power consumed by the energy storage system when charging the energy storage system such that the first amount of power, an amount of power consumed by auxiliary power consumers, and the charging amount of power, and optionally an amount of power corresponding to a power safety margin, are in sum equal to or less than a maximum power rating of the power generation system. Maximum power rating may refer to the upper limit at which the power generation system is capable or rated to continuously generate and deliver electrical power.

In an example, the maximum power limit of the power delivery interface may be a predefined static limit or a dynamic limit. The static limit may be determined by at least one of a power capacity of the external system, a power capacity of the power delivery interface, a power capacity of one or more power lines providing a connection between the power delivery interface and the external system, or a power rating of the wind turbine for power output at the power delivery interface. The dynamic limit may be determined by at least one of a wind farm controller of a wind farm of which the wind turbine forms part (e.g., by sending respective information to the wind turbine), by a wind turbine controller of the wind turbine, or by the external system, e.g., by grid conditions of a collector grid or utility grid to which electrical power is delivered via the power delivery interface. For example, the power intake capacity of a collector grid into which the wind turbine feeds electrical power may limit the power output via the power delivery interface. Such limit may be determined by the wind turbine controller, for example by receiving respective information from the wind farm controller, by making measurements on the respective grid, or by any other known methods. Also, in situations in which the power delivered via the delivery interface is limited dynamically, any surplus energy may thus efficiently be used for re-charging the energy storage system.

The power may be provided from the power generation system to the power delivery interface via a main power delivery path. The energy storage system may be coupled to the main power delivery path between the power generation system and the power delivery interface. The power for charging the energy storage system may accordingly be diverted prior to the delivery interface, so that no power reduction may occur behind the power delivery interface due to any charging of the energy storage system (i.e., the charging may not affect the power level external to the wind turbine). The coupling may certainly comprise one or more components, such as a circuit breaker, power conditioning equipment (e.g., AC-to-DC converter) and the like.

A wind turbine transformer may be connected in the power delivery path between the power delivery interface and the coupling to the energy storage system. The energy storage system may thus be supplied by a low or medium voltage level present within the wind turbine.

The power generation system may for example comprise at least a generator and a power converter; it may optionally further comprise a power filter, which may for example provide harmonic filtering. The coupling towards the energy storage system may for example be provided between the power generation system and a wind turbine transformer, e.g., between a respective power filter and the wind turbine transformer. The power generation system may have any known topology, such as a full converter topology, a DFIG topology, or the like.

The energy storage system may be operable in a discharging mode, in which it provides electrical power to at least one of one or more auxiliary consumers of the wind turbine, to the power generation system of the wind turbine (e.g., during powering-up or during service of the wind turbine, for example for energizing a power converter), and/or to the power delivery interface (e.g., for providing electrical power to the external system, e.g., for feeding power into the power grid). The stored energy may thus be used for different purposes, such as for supplying the wind turbine systems in the absence of power generated from the wind or supplied from the grid, for smoothing power delivery to the power grid or time-shifting the delivery of power to better align the power delivery with power demand and/or electricity pricing.

The energy storage system may be configured to receive electrical energy and to store energy, either in a form of electrical energy or in form of a different type of energy, such as mechanical, chemical, or thermal energy. For example, the energy storage system may be a battery electric storage system (BESS), a super-capacitor storage system, a flywheel storage system, a hydrogen storage system (which may comprise a respective electrolyzer, hydrogen tank and fuel cell), a thermal energy storage system or the like. The energy storage system may in particular be configured to receive electrical energy, store the energy, and discharge the energy again in the form of electrical energy (e.g., by providing electrical power over a certain period of time).

The energy storage system may have a storage capacity of at least 100 kWh. The capacity may be even higher, it may for example be higher than 150 kWh, 200 kWh or even 500 kWh; it may lie within the range of 100 kWh to 10 MWh. The energy storage system may thus be used not only for powering auxiliary consumers, but also for storing power for time shifting power supply to the external system, e.g., to times of low wind conditions, high power demand and/or high electricity prices.

The energy storage system may be configured as an inline energy storage system in which an auxiliary network feeding auxiliary consumers of the wind turbine receives electrical power through the energy storage system. A bypass connection bypassing the energy storage system may be provided in such configurations. In such configuration, the energy storage system may accordingly operate as an uninterruptable power supply for the auxiliary consumers of the wind turbine, as they will continue to receive electrical power from the energy storage system even if no electrical power is available on the main power delivery path. The energy storage system may also be configured as a line interactive energy storage system, wherein the auxiliary consumers of the wind turbine may be coupled by an electrical connection to the main power delivery path, and the energy storage system may be coupled to this electrical connection. In such configuration, the auxiliary consumers may be supplied directly from the main power delivery path, and a switch may be used to change over the supply to the energy storage system. In either configuration, it may be possible for the energy storage system to supply the auxiliary consumers of the wind turbine with electrical power while the wind turbine is either connected or disconnected from the grid. Further, in embodiments, the energy storage system may also be configured to supply electrical power to the main power delivery path, either for supplying electrical power to the external system or to the power generation system of the wind turbine.

In an example, monitoring the amount of electrical power provided from the power generation system to the power delivery interface may comprise receiving measurement data from a monitoring unit that monitors the power flow towards the power delivery interface. As an example, a current transformer (CT) may be comprised in the monitoring unit. The monitoring unit may for example be configured to monitor the power flow on the main power flow path between the coupling to the power storage system and the power delivery interface, in particular between the coupling to the energy storage system and the wind turbine transformer. The voltage on the main power delivery path may further be monitored, for example by obtaining respective voltage level information from the wind turbine or converter controller which may operate in accordance with respective voltage set points, or by measurements. By performing the measurement prior to the transformation, measurements on the higher voltage side of the wind turbine transformer may not be required.

The amount of electrical power provided to the power delivery interface may be determined by applying a transfer function to the measurement data. Losses due to the transformer and power transport may thereby be considered. Alternatively, a transfer function may be applied to the maximum power limit to derive an adjusted maximum power limit for the location of the monitoring unit (this transfer function may be the inverse of the formerly mentioned transfer function). Determining that the amount of electrical power delivered to the power delivery interface is at or close to the maximum power limit may then comprise comparing the electrical power derived from measurements by the monitoring unit with the adjusted maximum power limit for the location of the monitoring unit. In either case, it may reliably be determined that electrical power at the maximum power limit is provided at the power delivery interface. As losses between the power generation system and the location of the monitoring unit may be relatively low, the adjusted maximum power limit (approximately) corresponds to the first amount of electrical power.

In embodiments the method may further comprise, when operating in the charging mode, controlling the wind turbine to generate by the energy generating system an amount of electrical power larger than the first amount. It may in particular be controlled such that the energy generating system generates the generatable amount of electrical power, or the amount of generatable power minus the safety power margin, if such margin is employed. The generated electrical power is then supplied to the power delivery interface at the maximum power limit, supplied to any operating auxiliary consumers, and the remaining generated electrical power is used for charging the energy storage system. Efficient use is thus made of the available power, and the maximum amount of electrical power can continue to be supplied via the power delivery interface. The power generation system may in particular generate more than a nominal power rating of the wind turbine at the power delivery interface. It may in particular be controlled to generate electrical power at the maximum power rating of the power generation system, minus the safety power margin if such is employed. It may thus be controlled to generate the first amount of electrical power, plus any power for the auxiliary consumers, plus electrical power in accordance with any remaining power capacity for charging.

In of the embodiments, the method may further comprise changing operation to the charging mode, irrespective of whether the predefined condition is met, if one or more of the following exceptional conditions are met: A charging state of the energy storage system reaching or dropping below a predetermined threshold; receipt of a user command to recharge the energy storage system; identification of a future demand for energy from the energy storage system; and a detection that an external parameter meets a predefined criterion. By making use of such exceptional conditions, it may be ensured that sufficient energy is available and stored in the energy storage system to perform its intended function, such as providing power to systems of the wind turbine or to the external system. An external parameter may for example be an energy price which may need to drop below a price threshold to meet the predefined criterion, or power available on the power grid, which may rise above a respective threshold to meet the predefined criterion. This may be detected by receiving external information such as operator information, pricing information and the like, or may be detected by detecting properties of the grid, such as a rising frequency or rising voltage on the grid.

The electrical power mentioned herein may in particular refer to active power.

According to another aspect of embodiments of the present invention, a control system configured to control the charging of an energy storage system of a wind turbine is provided. The wind turbine comprises a power generation system for generating electrical power and a power delivery interface for delivering the generated electrical power to an external system that is external to the wind turbine. The control system is configured to perform the steps of obtaining a maximum power limit to which electrical power supplied to the external system via the power delivery interface is limited; monitoring at least one of an amount of electrical power provided from the power generation system to the power delivery interface or an amount of power generatable by the power generation system; determining if a predefined condition is met, wherein determining that the predefined condition is met requires at least determining, based on the monitoring, that the amount of power generatable by the power generation system is larger than a first amount of electrical power required to deliver via the power delivery interface electrical power at the maximum power limit; and if the predefined condition is met, operating a power system of the wind turbine in a charging mode in which electrical power generated by the power generation system in addition to the first amount of electrical power is supplied from the power generation system to the energy storage system to charge the energy storage system. By such control system, advantages similar to those outlined further above with respect to the method may be achieved.

The control system may be configured to carry out the method of any of the embodiments and examples disclosed herein.

According to a further aspect, a wind turbine comprising such a control system may be provided. The wind turbine may further comprise the power generation system, the energy storage system and the power delivery interface. The wind turbine may further comprise any of the components disclosed herein with respect to the wind turbine, such as the power system, the transformer and/or one or more auxiliary power consumers.

According to another aspect of embodiments of the present invention, a computer program for controlling a charging of an energy storage system of a wind turbine is provided. The wind turbine comprises a power generation system for generating electrical power and a power delivery interface for delivering the generated electrical power to an external system that is external to the wind turbine. The computer program comprises control instructions which, when executed by a processing unit of a control system controlling a power system of the wind turbine, cause the processing unit to perform any of the methods disclosed herein. Such a computer program may be provided as a computer program product (non-transitory computer readable storage medium having instructions, which when executed by a processor, perform actions). The computer program may be downloadable by a network interface and/or may be provided on a data carrier or data storage medium, which may be volatile or non-volatile.

It is to be understood that the features mentioned above and those yet to be explained below can be used not only in the respective combinations indicated, but also in other combinations or in isolation, without leaving the scope of embodiments of the present invention. The features of the different aspects and embodiments of the invention can be combined with each other unless noted to the contrary.

BRIEF DESCRIPTION

Some of the embodiments will be described in detail, with references to the following Figures, wherein like designations denote like members.

FIG. 6 is a flow diagram illustrating a method of charging an energy storage system of a wind turbine according to an embodiment of the invention.

DETAILED DESCRIPTION

Figure 1:
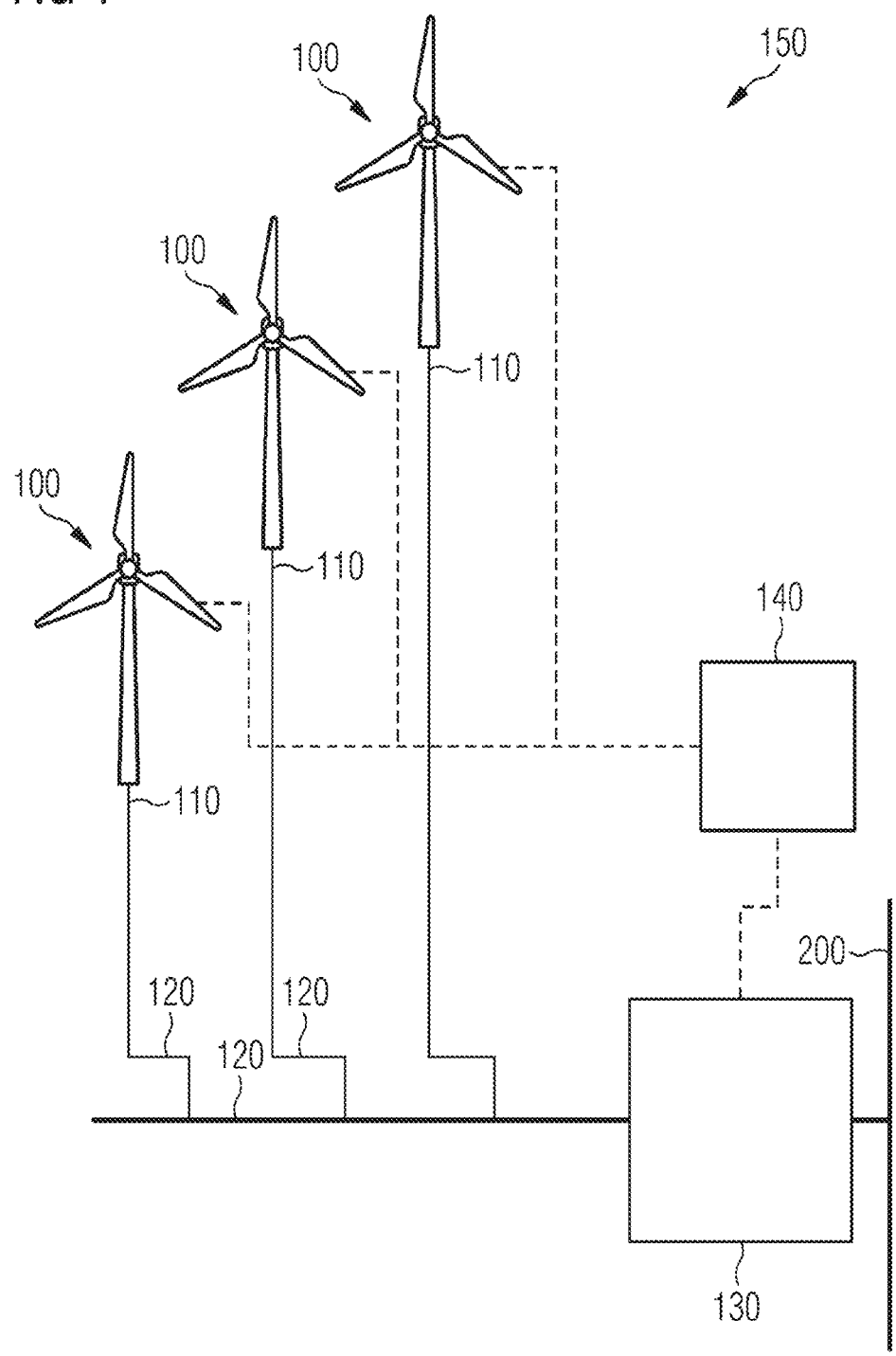
FIG. 1 is a schematic drawing showing a wind farm with wind turbines having a power delivery interface according to an embodiment of the invention.

In the following, embodiments and/or examples of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 illustrates a wind farm 150 comprising plural wind turbines 100 according to an example of embodiments of the invention. Each wind turbine 100 has a power delivery interface 110 via which it provides electrical power into a collector grid 120. A substation 130 may couple the collector grid 120 to a power grid 200, such as a utility grid. Substation 130 may for example comprise a substation transformer. A wind farm controller 140 may be provided and may control operation of wind turbines 100, for example by sending respective active and/or reactive power setpoints to the wind turbines.

Wind turbines 100 may have a maximum power limit of electrical power allowed to be delivered by the respective wind turbine 100. The maximum power limit may be determined by the maximum amount of power that the wind turbine is configured to deliver via delivery interface 110, for example by a nominal power rating of the wind turbine. The electrical infrastructure external to the wind turbine is generally sized to accommodate the maximum amount of power that may be delivered from the wind turbine. Such electrical infrastructure may for example comprise respective cabling, switches and other control apparatus. In other examples, the maximum power limit at delivery interface 110 may be determined by the limits of the electrical infrastructure external to the wind turbine. Also, the external infrastructure, such as the collector grid 120, may have limits regarding the feeding of electrical power by multiple wind turbines into such infrastructure.

Furthermore, the maximum power limit at the delivery interfaces 110 may be dynamic and/or may be set individually for each wind turbine. For example, wind farm controller 140, or another control system, may set respective limits. Such limits may be determined based on grid conditions of collector grid 120 and/or power grid 200, environmental conditions, e.g., a production level of other nearby power producers and the like.

FIG. 1 illustrates only an example, and a wind turbine 100 having a respective power delivery interface 110 may be provided in other environments, it may for example feed power to a single electrical load, such as a hydrogen production system or an island grid. As described hereinafter, wind turbine 100 may be controlled such that power is delivered via delivery interface 110 at the maximum power limit, while allowing a charging of an energy storage system of the respecting wind turbine without compromising power delivery.

Figure 2:
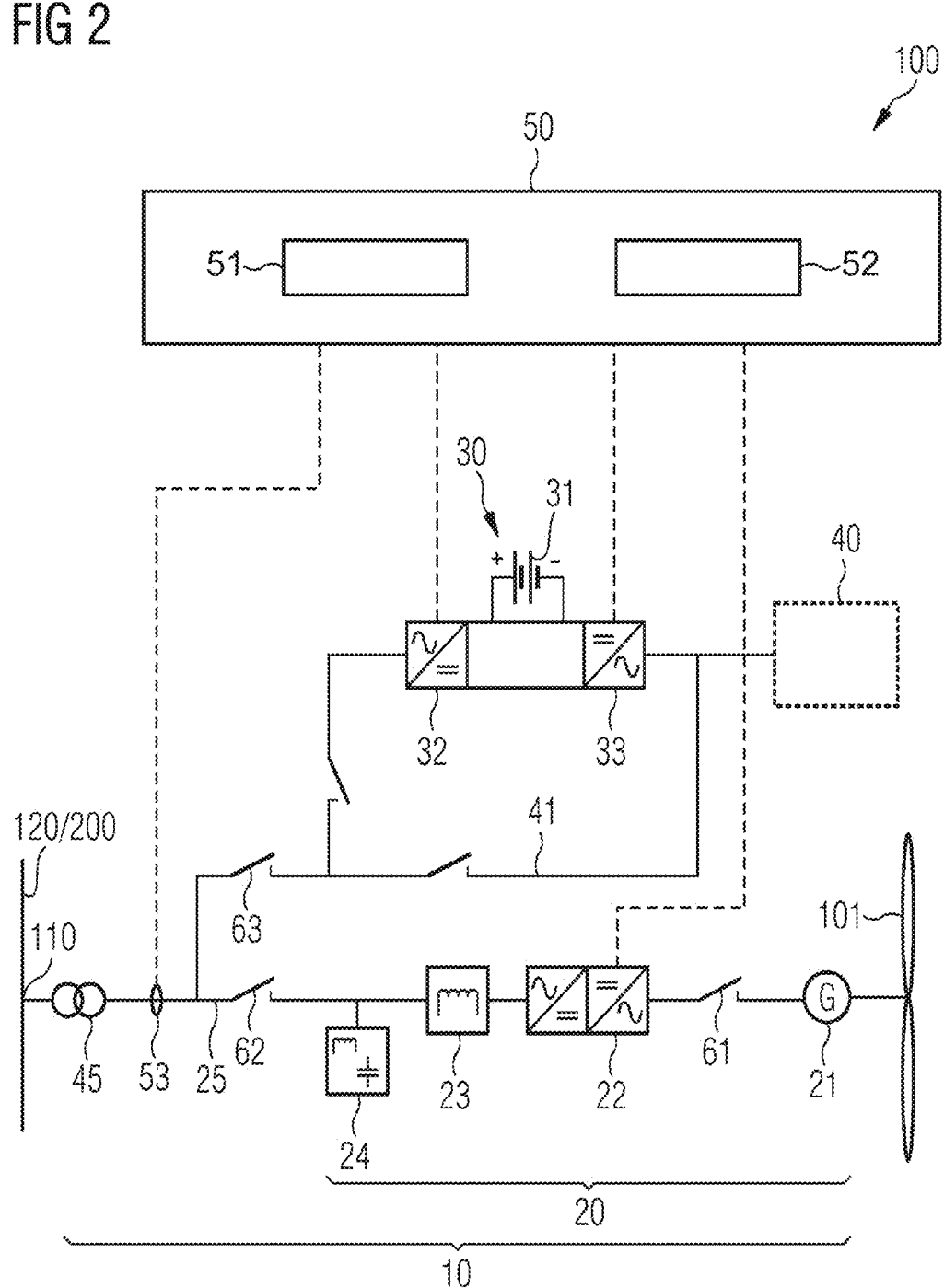
FIG. 2 is a schematic drawing showing a wind turbine comprising a power system and a control system according to an embodiment of the invention.

An exemplary configuration of wind turbine 100 is shown in FIG. 2, wherein the wind turbine may comprise a rotor 101, a power system 10 and the power delivery interface 110, via which electrical power may be provided to the collector grid 120, the power grid 200 or any other external system. Power system 10 may comprise power generation system 20, energy storage system 30, one or more auxiliary consumers 40 and transformer 45. It may further comprise a generator circuit breaker 61, a main circuit breaker 62 and/or an auxiliary circuit breaker 63.

Power generation system 20 may comprise a generator 21 receiving rotational mechanical energy from rotor 101 and converting it into electrical energy, power conditioning equipment 22, 23, 24, which may comprise a power converter 22, and optionally a reactor 23 and/or harmonic filter 24. Power generation system 20 may also be termed "electrical drivetrain", which provides conditioned electrical power generated by the wind turbine.

Power generation system 20 may have any of the known configurations. FIG. 2 illustrates a full converter topology; however, other topologies, such as a doubly-fed induction generator (DFIG)-topology may also be employed. In operation, electrical power generated by power generation system 20 may be delivered along a main power delivery path 25 via the wind turbine transformer 45 to the delivery interface 110. Energy storage system 30 may be coupled or connected to the main power delivery path 25 between the power generation system 20 and the delivery interface 110, in particular between system 20 and transformer 45. FIG. 2 illustrates one exemplary coupling and configuration of energy storage system 30. Energy storage system 30 comprises a battery 31 that is essentially coupled to a DC-bus of a converter comprising a rectifier 32 and an inverter 33. By controlling rectifier 32, charging battery 31 from the main power delivery path 25 may be controlled. For discharging battery 31 to the auxiliary consumers 40, inverter 33 may be controlled. Rectifier 32 may also be operated as an inverter to discharge battery 31 towards the main power delivery path 25, for example for providing electrical power either to power generation system 20 (e.g., for energizing converter 22 during startup, or for operating generator 21 as a motor during maintenance), or for providing electric power towards power delivery interface 110 (e.g., for supplementing the power output, time-shifting the power output or the like). A bypass 41 may be provided around energy storage system 30 to allow a direct supply of electric power to auxiliary power consumers 40.

Other implementations of energy storage system 30 are certainly conceivable. It may comprise a flywheel storage system with an electric machine that accelerates the flywheel for storing energy or operates as generator for withdrawing energy; a hydrogen storage which may comprise an electrolyzer for generating hydrogen, a tank for storing generated hydrogen, and a fuel cell for generating electric power from stored hydrogen; a super-capacitor bank; a thermal storage system; and other kinds of physical or chemical energy storage systems. In these examples, the energy storage system 30 is configured to be chargeable by receiving electrical power and dischargeable by providing electrical power.

The one or more auxiliary power consumers 40 may comprise main auxiliary consumers, such as drives and/or actuators that operate auxiliary systems of the wind turbine. Examples are a yaw drive, e.g., respective motors, a pitching drive, e.g., respective motors or hydraulic pumps, a cooling drive of a cooling system, e.g., respective pumps, and the like. The main auxiliary consumers may have a combined power rating above 100 KW, for example in the range of 100 kW to 300 kW.

Power delivered by wind turbine 100 at delivery interface 110 may be controlled by a wind turbine controller. At sufficiently high wind speeds, the power generation system 20 may generate an amount of electrical power (first amount) that corresponds to the maximum power limit at the power delivery interface 110. At higher wind speeds, the wind turbine controller may regulate the power extracted from the wind by pitching out blades of rotor 101 to limit the torque on the rotor and thereby the power being generated. In such situation, more energy may be available in the wind than can be converted to electrical power and provided to the external interface. The power generation system 20 may be configured to have a power rating that is higher than the maximum power limit at power delivery interface 110, even if this maximum power limit corresponds to the rated output power of wind turbine 100 (which may also be termed "nominal" or "name plate power" of the wind turbine). The additional overhead capacity provided by power generation system 20 is generally provided for allowing the auxiliary power consumers 40 to be operated even when providing a power output at the rated power. For example, such power may be needed to actuate the yaw drive to keep the wind turbine rotor in the correct orientation to the wind direction, to actuate the rotor blade pitch drives and the like.

Wind turbine 100 may comprise a control system 50 that may control the charging and discharging of the energy storage system 30. Control system 50 may make use of this overhead capacity of the power generation system 20 to charge the energy storage system 30 while the wind turbine is providing electrical power at the maximum power limit at delivery interface 110. Such overhead capacity may be available for charging in particular if it is not fully utilized by the auxiliary power consumers 40 and for covering any losses that may occur on the path towards the delivery interface 110. The amount of power that may be re-directed for both operating the auxiliary consumers 40 and for recharging the energy storage system 30 may be limited by the electric power rating of the electric components of power generation system 20, as well as of any supply circuit utilized for re-directing the power. The available spare margin beyond the instantaneous consumption of auxiliary consumers 40 may be used for recharging.

Such charging (i.e., operation in a charging mode) may for example be initiated by control system 50 if it is determined that a predefined condition is met. Such condition may in particular comprise that the electric power generated by power generation system 20 is more than the amount of power required to deliver at delivery interface 110 the maximum allowable power (i.e., power at the maximum power limit). More power than the above-mentioned first amount thus needs to be provided by power generation system 20. Different possibilities exist for determining that the predefined condition is met. For example, a monitoring unit may be provided, e.g., in the form of a current transformer 53. The current transformer 53 may measure the current level on the main power delivery path towards the interface 110. In combination with a measured voltage on the power delivery path (which may be measured or obtained from a wind turbine controller or converter controller) may be used to determine the power delivered to the power delivery interface 110. As the power delivery interface 110 may be on the grid side of the transformer 45, as in the example of FIG. 2, a transfer function may be employed by control system 50 to adjust the maximum power to account for losses associated with the transformer and any ohmic losses prior to the power delivery interface 110. Such transfer function may either be applied to the maximum power limit to compare a respective adjusted maximum power limit with the power determined at the location of the current transformer 53, or the measured power may be transformed via a respective (inverse) transfer function and may be compared to the original maximum power limit at the location of interface 110. The first amount of power that the power generation system 20 needs to deliver may accordingly be higher than the maximum power limit, and it may approximately correspond to the adjusted maximum power limit.

Another possibility to determine that the power generation system 20 is capable of generating an amount of electrical power larger than the first amount is to receive respective information from a controller, such as a wind turbine controller or converter controller. If the amount of generated electrical power is about to exceed the maximum power limit at interface 110, the wind turbine controller will generally take measures to reduce the amount of power generation, so that respective information on the amount of generated electrical power is available. Based on such information, it may be determined that the respective predefined condition is met and that operation in the charging mode can commence.

Control system 50 may be implemented by a controller that is separate from a wind turbine controller; in other examples, such controller may form part of the wind turbine controller, i.e., control system 50 may be implemented by the wind turbine controller.

Control system 50 may comprise a processing unit 51 and a memory 52. Processing unit 51 may be any kind of processor, such as a microprocessor, a digital signal processor, an application specific integrated circuit or the like. Memory 52 may comprise any kind of memory, such as RAM, ROM, Flash-Memory, EEPROM, a hard-disk drive and the like. Memory 52 may store control instructions which when executed by processing unit 51 cause the control system 50 to perform any of the methods described herein, and in particular control the wind turbine 100 and its components in accordance with any of the described methods.

Figure 4:
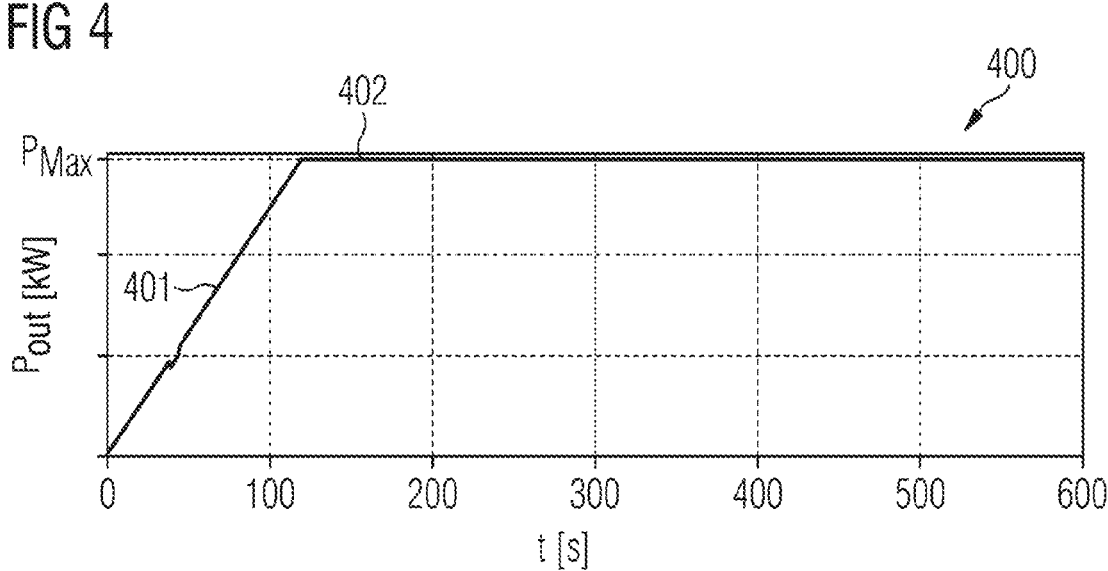
FIG. 4 is a schematic diagram illustrating the power supplied to a power delivery interface, the power supplied to one or more auxiliary power consumers, a safety power margin and a spare power margin used for charging according to an embodiment of the invention.
Figure 4:
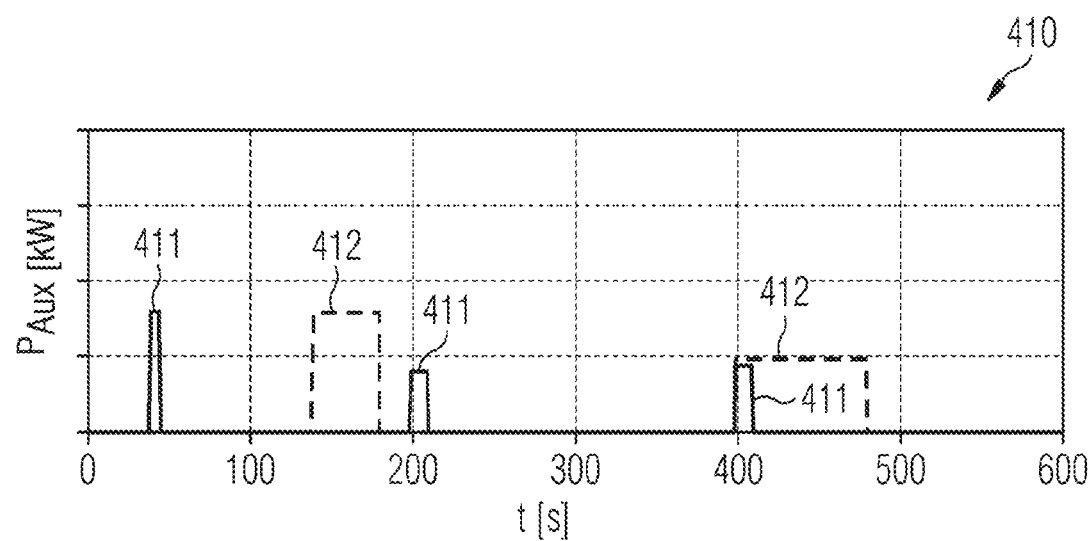
Figure 4:
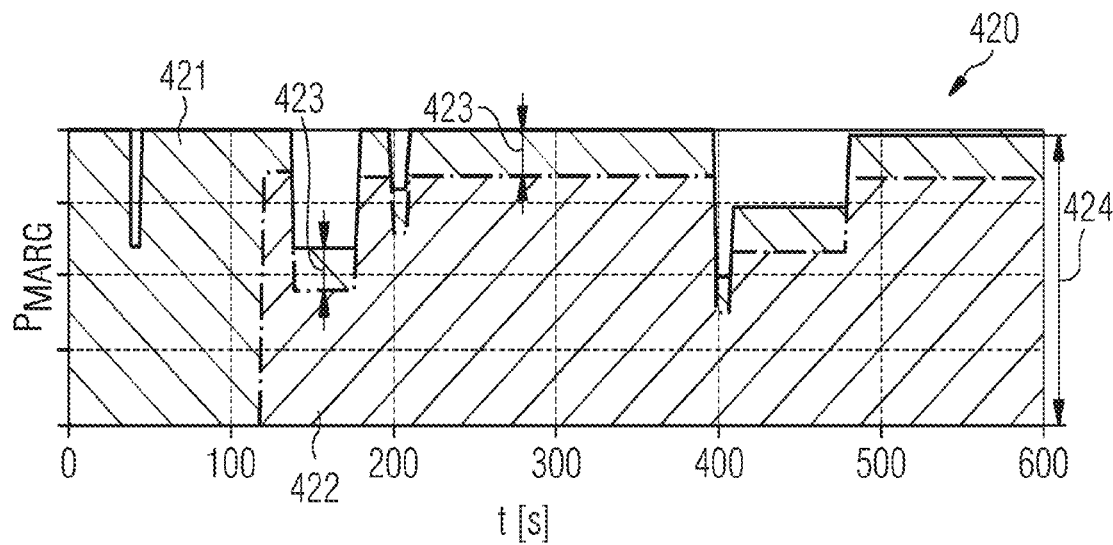

For an exemplary operation of wind turbine 100, FIG. 4 illustrates the different power levels. In diagram 400 of FIG. 4, the output power POUT at the power delivery interface 110 is illustrated. In the first part of the curve 401, wind speed is still below the rated wind speed. As the wind speed increases, the output power increases and finally reaches the maximum power limit 402 at the delivery interface 110 ($P_{MAX}$). As the wind speed remains above the rated wind speed, the power level at the output remains steady for the remaining duration of the plot. At about 40 seconds, a small dip can be observed in curve 401. Diagram 410 of FIG. 4 illustrates the power consumption of auxiliary power consumers 40 during the same time period. It can be seen that the dip in curve 401 is caused by a power consumption 411 of the yaw drive. The dip occurs below the maximum power limit 402, the power that may be delivered from the power generation system 20 is limited by the torque that is provided by the rotor 101 at the given wind speed. In such conditions, power consumption by auxiliary consumers will result in a re-direction of power delivered to the delivery interface 110, so that it is essentially subtracted from the output of the wind turbine. Charging of energy storage system 30 during such periods of operation would thus likewise have a negative impact on the power delivery via interface 110.

Diagram 410 shows further power consumption by auxiliary consumers 40, such as power consumption 411 by the yaw drive and power consumption 412 by a cooling system (e.g., cooling pump). It can be observed that as the wind turbine provides power at the maximum power limit 402 at the delivery interface 110, the subsequent operation of auxiliary power consumers 40 does not reduce the power delivered to the interface. The control system of the wind turbine, in particular wind turbine controller and/or converter controller), may adjust the power delivered by the power generation system 20 to compensate for the power usage by auxiliary consumers 40. Such control may ensure that the delivery interface 110 receives the maximum possible power even while internal power consumption fluctuates.

The diagram 420 of FIG. 4 illustrates the overhead capacity for power generation available at the power generation system 20 during the respective time period. During the initial phase of low wind speeds, the power generation system 20 is operating significantly below its power rating and thus has sufficient spare capacity; however, charging is not performed for the reasons outlined above. In diagram 420, the total available margin is shown with area 421, whereas area 422 illustrates a spare power margin, which is power available for charging the energy storage system. The overall overhead capacity (which may correspond to the above-mentioned second amount) is shown at reference numeral 424. While the power production is increasing (curve 401), there is no power allowance for charging the energy storage system. Upon the power output at the interface 110 reaching the maximum power limit, spare power capacity 422 may be made available for recharging the energy storage system 30. The power margin 421 may not fully be provided for charging, but a safety power margin 423 may be maintained. By such safety margin, it may be avoided that the overall capacity limit is reached, for example when powering-up new auxiliary consumers 40. As can be seen, as auxiliary power consumers 40 draw power, as shown in diagram 410, the power margin 421 and thus also the spare power margin 422 available for charging is reduced, complementarily to the power consumption of these auxiliary power consumers. By controlling the charging in such way that the power drawn by the energy storage system 30 stays within the spare power margin 422, it may be ensured that the power generation system 20, in particular its components, stays below its rated power (i.e., the allowable maximum power may not be reached or exceeded).

Figure 3:
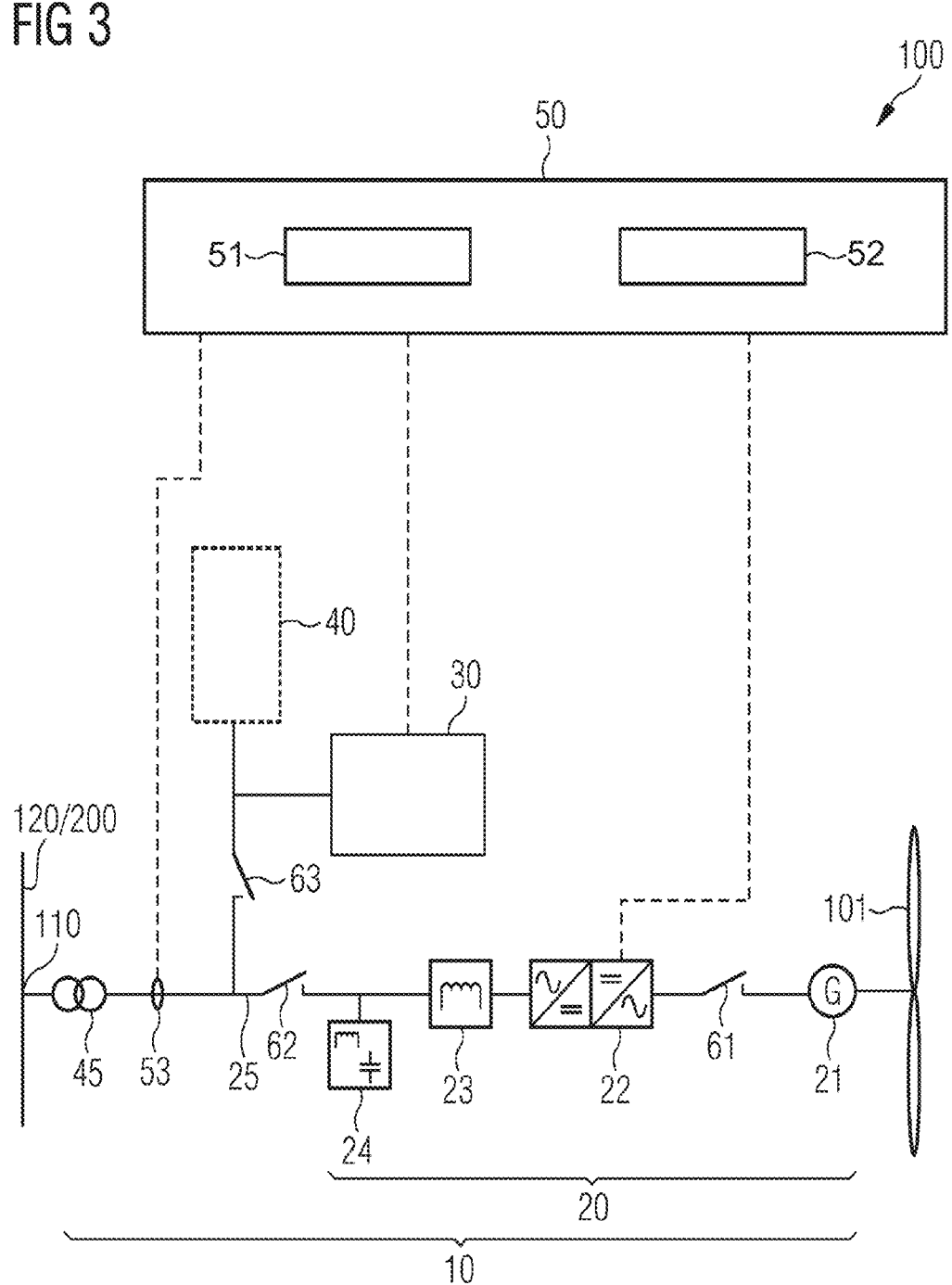
FIG. 3 is a schematic drawing showing a wind turbine comprising a power system and a control system according to an embodiment of the invention.

FIG. 3 shows another example of the wind turbine 100, in which the coupling of the energy storage system 30 has been modified compared to the wind turbine of FIG. 2. The above explanations are thus equally applicable to the wind turbine 100 of FIG. 3, and only differences will be briefly explained. In the wind turbine 100 of FIG. 3, the energy storage system 30 is provided as a line-interactive energy storage system, which is coupled to a connection between the one or more auxiliary power consumers 40 and the main power delivery path 25. In such configuration, power is generally directly provided from the main power delivery path 25 to the auxiliary power consumers 40, without passing through the energy storage system 30. However, similar to the configuration of FIG. 2, the energy storage system 30 may likewise be capable of receiving electrical power from the main power delivery path 25 for charging, and to supply electrical power to either one or more of the auxiliary power consumers 40, the power generation system 20, or the power delivery interface 110. Any other conceivable possibility of coupling the energy storage system 30 to the main power delivery path 25 may likewise be employed in embodiments of the invention.

Figure 5:
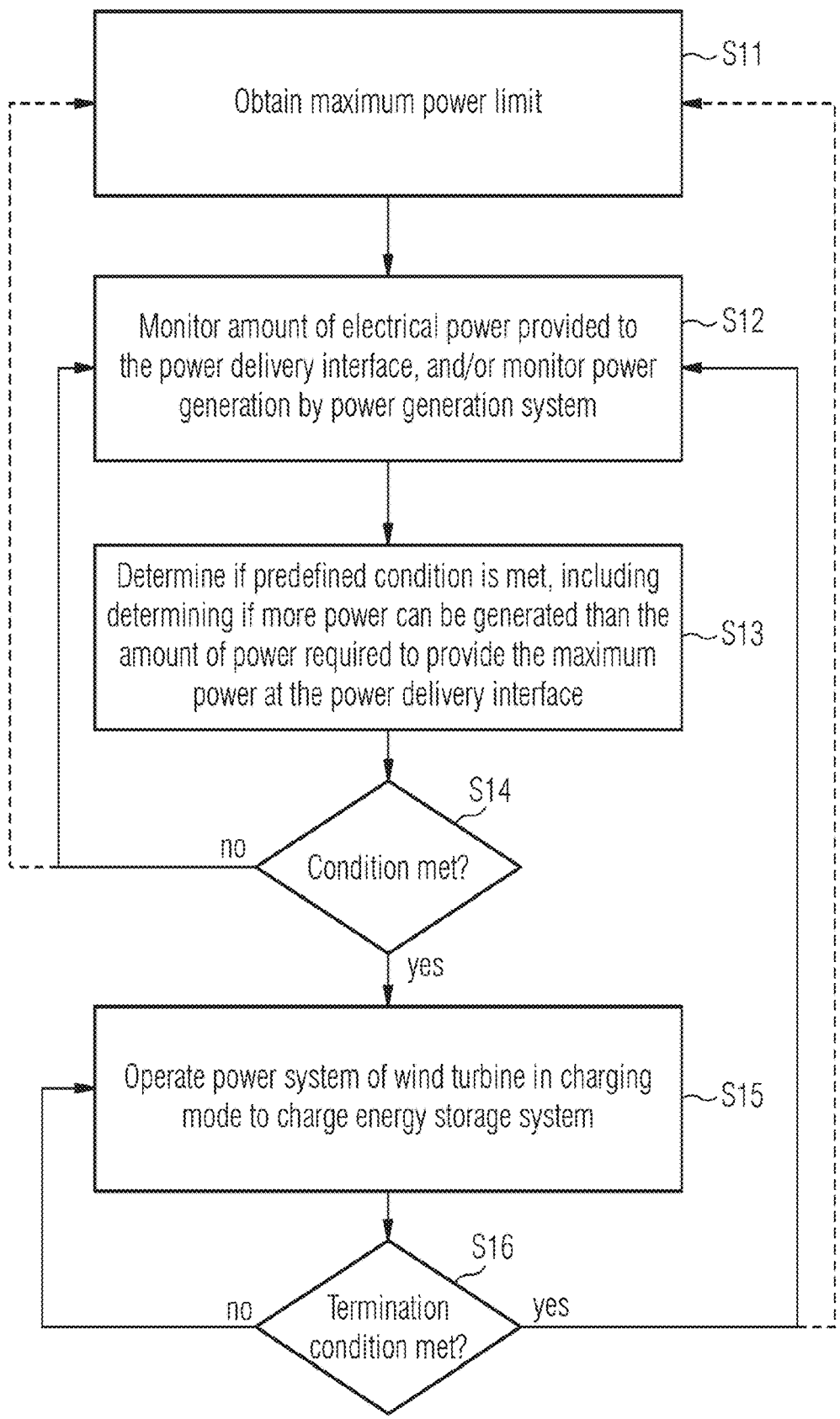
FIG. 5 is a flow diagram illustrating a method of charging an energy storage system of a wind turbine according to an embodiment of the invention.

FIG. 5 shows a flow diagram illustrating a method according to an example. In step S11, a maximum power limit $P_{MAX}$ 402 is obtained. As outlined above, this may be a static limit, such as a maximum power rating of the wind turbine power output, or a dynamic limit, for example obtained from wind farm controller 140. In step S12, it may be monitored if a sufficient amount of electric power for charging is available, for example by monitoring the amount of electrical power provided to the power delivery interface, and/or by monitoring power generation by the power generation system 20.

In step S13, it may be determined if a predefined condition is met. One or more requirements may need to be fulfilled so that the predefined condition is met. One requirement may be that it is determined that more power can be generated (i.e., is generatable) than the amount of power required to provide power at the power delivery interface corresponding to the maximum power limit, i.e., to provide the maximum power at delivery interface 110. Further requirements may apply, such as that the charging level of the energy storage system 30 is not above a predefined level, i.e., that there is still capacity for charging. If these two and optionally further applicable requirements are met, it may be determined in step S14 that the predefined condition is met. If the predefined condition is met, the method may continue in step S15 with operating the power system of the wind turbine in a charging mode in which electrical power provided by power generation system 20 is supplied to the energy storage system 30 for charging. The energy storage system 30 may for example be controlled such that it consumes an amount of power available in excess of the first amount of power required to supply the maximum power at the interface 110. As mentioned above, the power consumed by energy storage system 30 may be controlled such that the total power supplied by the power generation system 20, comprising the first amount of power, the power consumption by auxiliary consumers 40, the power used for charging, and optionally a safety power margin, do not exceed a maximum power rating of power generation system 20. As shown in diagram 420 of FIG. 4, the power illustrated by the spare power margin 422 may in particular be utilized for charging.

In step S16, it may be checked if a termination condition for the charging is met. Such termination condition may for example be that a predefined charging state is reached by the energy storage system 30, that the predefined condition is no longer met, in particular that the wind speed drops so that no spare power margin 422 is available for charging, and/or other condition, such as a stop command or the like. If the termination condition is met, the method may terminate the charging mode and continue in step S12, or optionally, in particular if a dynamic maximum power limit is applied, in step S11. Similarly, if it is determined in step S14 that the condition is not met, the method may continue either with step S12, or in case of a dynamic maximum power limit, with step S11.

FIG. 6 is a flow diagram illustrating a method according to another example. In step S21, it is again checked if the power generation by the power generation system 20 provides power at the maximum power limit at the power delivery interface (in correspondence with steps S11 to S13 of FIG. 5). In step S22, the above-mentioned second requirement may be checked, in particular whether the state of charge of the energy storage system is below a predetermined state of charge level. If both requirements in steps S21 and S22 are met (which may correspond to the condition being met in step S14), the method may continue in step S23 by operating in a charging mode in which energy storage system 30 is recharged. As the charging mode was entered by determining in step S21 that the maximum power is provided at the power delivery interface, the charging may occur by using the marginal capacity 422 available for recharging.

If the predefined condition is not met, and in particular if the requirement checked in step S21 is not met, the method may continue with step S24, wherein it may be checked if an exceptional condition may apply. If such exceptional condition applies, the energy storage system may be permitted to recharge during periods in which the power for recharging reduces the power delivered to interface 110. Such exceptional condition may for example be that a state of charge of the energy storage system 40 is below a predetermined threshold. An exceptional condition may also apply if a user command is received by which the user manually commands the wind turbine to recharge the energy storage system. Another example in which an exceptional condition may apply is that an energy demand for withdrawal of electric power from the energy storage system is predicted. It may for example be detected by controller 50 that the wind turbine has just recovered from a grid fault or outage or may be experiencing unstable grid conditions. In such case, electrical power may need to be provided by the energy storage system 30 to stabilize grid conditions, or to support the startup of the wind turbine. It is thus desirable to recharge the energy storage system 30 prior to such demand. Another exceptional condition may be present if the demand for electric power on the external system is particularly low, for example a low demand on power grid 200, and/or the price of electricity is very low, e.g., below a respective threshold. In such situations, reducing the electric power provided via interface 110 as a consequence of charging the energy storage system 30 may have only a limited negative effect, as there may be only little loss of revenue or as the respective electrical power may not be needed due to the low demand.

If one of these exceptional conditions applies in step S24, the method may continue with step S22 or directly with step S23. Operation may accordingly transition into the charging mode (if the condition of step S22 is met, or directly) in which the energy storage system is recharged in step S23. Recharging may in this case occur regardless of whether or not a spare power margin is available and may accordingly result in a reduction of the power output at the power delivery interface. If no such exceptional condition applies in step S24, the method may continue with step S25 in which recharging of the energy storage system is postponed and it is again checked in steps S21, S22 if the predefined condition is met.

The above are only exemplary implementations, and the method and/or control system may be implemented differently in other examples. For example, step S22 may be performed as part of step S21 in FIG. 6, or may be performed prior to that. Step S22 may be provided as an additional step in the method of FIG. 5, e.g., after step S13, and steps S11 to S13 may implement step S21 of FIG. 6. Steps S24 and S25, as well as step S22 are optional, and may be comprised in the method of FIG. 5.

By the examples disclosed herein, the spare capacity of the electrical power generation system 20 may be used for recharging the energy storage system, thus improving the amount of electric power that can be provided via interface 110. Further, operation of internal components of the wind turbine may not lead to a reduction of the power output. Wind turbine energy production may thus be maximized, in particular the AEP (annual energy production). At the same time, the state of charge of the energy storage system 30 may be maintained. Further, by allowing exceptions for the recharging control, it may be ensured that a sufficient amount of stored electric energy is available in certain situations. Considerable advantages may thus be achieved.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of charging an energy storage system of a wind turbine, wherein the wind turbine comprises a power generation system for generating electrical power and a power delivery interface for delivering the generated electrical power to an external system that is external to the wind turbine, wherein the wind turbine is configured to output a maximum amount of power via the power delivery interface that corresponds to a power rating of the wind turbine, and wherein the power generation system is configured to generate at least a first amount of electrical power that corresponds to the power rating of the wind turbine at the power delivery interface and a second amount of electrical power in excess of the first amount, wherein the method comprises:

obtaining a maximum power limit to which electrical power supplied to the external system via the power delivery interface is limited, wherein the maximum power limit corresponds to the power rating of the wind turbine;

monitoring at least one of an amount of electrical power provided from the power generation system to the power delivery interface or an amount of power generatable by the power generation system;

determining if a predefined condition is met, wherein determining that the predefined condition is met requires at least determining, based on the monitoring, that the amount of power generatable by the power generation system includes at least the first amount and the second amount of electrical power; and if the predefined condition is met, operating a power system of the wind turbine in a charging mode wherein an amount of electrical power equal or less than the second amount is supplied from the power generation system to the energy storage system to charge the energy storage system.

2. The method according to claim 1, wherein determining that the amount of power generatable by the power generation system comprises at least the first amount and the second amount comprises determining that the monitored amount of electrical power provided to the power delivery interface corresponds to the maximum power limit.

3. The method according to claim 1, wherein operating in the charging mode comprises supplying, from the power generation system, electrical power at or close to the maximum power limit, or at the power rating of the wind turbine, to the power delivery interface.

4. The method according to claim 1, wherein a maximum amount of electrical power generatable by the power generation system is limited by one or more electrical components of the power generation system, wherein the second amount corresponds at most to an overhead capacity of the electrical power system that is a difference between the first amount and the maximum generatable amount of electrical power.

5. The method according to claim 1, wherein the second amount of power corresponds at least to a predetermined safety power margin plus a spare power margin, wherein in the charging mode, an amount of electrical power equal or less than the spare power margin is supplied from the power generation system to the energy storage system to charge the energy storage system.

6. The method according to claim 5, wherein the safety margin corresponds to an amount of electrical power required to operate at least one auxiliary power consumer of the wind turbine, wherein the at least one auxiliary power consumer includes an auxiliary drive of the wind turbine and/or a cooling system of the wind turbine.

7. The method according to claim 5, wherein the safety margin corresponds to an amount of electrical power required to operate at least one of a yaw drive or a pitch drive of the wind turbine.

8. The method according to claim 5, wherein the second amount of power corresponds at least to or is a sum of the safety power margin, the spare power margin and an auxiliary power consumption, wherein the auxiliary power consumption corresponds to an amount of electrical power that is being consumed by one or more auxiliary systems of the wind turbine different from the energy storage system.

9. The method according to claim 1, wherein the maximum power limit of the power delivery interface is a predetermined static limit.

10. The method according to claim 1, wherein power is provided from the power generation system to the power delivery interface via a main power delivery path, wherein the energy storage system is coupled to the main power delivery path between the power generation system and the power delivery interface.

11. The method according to claim 1, wherein monitoring the amount of electrical power provided from the power generation system to the power delivery interface comprises receiving measurement data from a monitoring unit that monitors the power flow towards the power delivery interface.

12. The method according to claim 1, wherein the method further comprises, when operating in the charging mode, controlling the wind turbine to generate by the energy generating system an amount of electrical power larger than the first amount.

13. The method according to claim 1, wherein the method further comprises changing operation to the charging mode, irrespective of whether the predefined condition is met, if one or more of the following exceptional conditions is met:
- a charging state of the energy storage system reaching or dropping below a predetermined threshold;
- receipt of a user command to recharge the energy storage system;
- identification of a future demand for energy from the energy storage system; and or detection that an external parameter meets a predefined criterion.

14. A computer program product, comprising a computer readable hardware storage device having computer readable program code stored therein, said program code executable by a processor of a computer system to implement a method for controlling a charging of an energy storage system of a wind turbine, wherein the wind turbine comprises a power generation system for generating electrical power and a power delivery interface for delivering the generated electrical power to an external system that is external to the wind turbine, wherein the computer program comprises control instructions which, when executed by the processor of a control system controlling a power system of the wind turbine, cause the processor to perform the method of claim 1.

15. A control system configured to control a charging of an energy storage system of a wind turbine, wherein the wind turbine comprises a power generation system for generating electrical power and a power delivery interface for delivering the generated electrical power to an external system that is external to the wind turbine, wherein the wind turbine is configured to output a maximum amount of power via the power delivery interface that corresponds to a power rating of the wind turbine, and wherein the power generation system is configured to generate at least a first amount of electrical power that corresponds to the power rating of the wind turbine at the power delivery interface and a second amount of electrical power in excess of the first amount, wherein the control system is configured to perform:
- obtaining a maximum power limit to which electrical power supplied to the external system via the power delivery interface is limited, wherein the maximum power limit corresponds to the power rating of the wind turbine;
- monitoring at least one of an amount of electrical power provided from the power generation system to the power delivery interface or an amount of power generatable by the power generation system;
- determining if a predefined condition is met, wherein determining that the predefined condition is met requires at least determining, based on the monitoring, that the amount of power generatable by the power generation system comprises at least the first amount and the second amount of electrical power; and
- if the predefined condition is met, operating a power system of the wind turbine in a charging mode wherein an amount of electrical power equal or less than the second amount is supplied from the power generation system to the energy storage system to charge the energy storage system.

* * * * *